Patented Jan. 14, 1930

1,743,447

UNITED STATES PATENT OFFICE

PAUL GANZINOTTI, OF UNION CITY, NEW JERSEY

PEARL CLOTH

No Drawing. Application filed March 31, 1927. Serial No. 180,062.

The object of the invention is to provide lustrous pearl cloth.

It has been attempted to coat cloth with pearl essence in varnish or lacquer solutions, by spraying or brushing the solution on the surface or by dipping the material to be coated in the solution, but it has not been possible to obtain a good result in this manner owing to the fact that the solution sinks into the pores of the cloth and therefore does not form a smooth reflecting surface which is most essential to show the luster of the essence to its true advantage. In general, it has not been possible to obtain a brilliant luster finish with pearl essence lacquer on any object that is not smooth or bright, except by first priming or covering the foundation with some material to act as a filler, but for most purposes that is not satisfactory for cloth or like material, even to the partial extent that it may be effective, since it renders the cloth too stiff.

According to my invention the nacreous coating is made apart from the cloth or other material to be coated, in the form of a brilliant pellicle or thin film, which is then cemented or otherwise applied to the cloth, the result being the subject of this invention. The pellicle is preferably made by incorporating the pearl essence known in the manufacture of artificial pearls, and which consists of the lustrous, light refracting particles or crystalloids obtained from fish-scales, in a suitable varnish or lacquer, specifically a cellulose lacquer, and casting a thin film of this solution or fluid containing the nacreous particles in suspension on a very smooth surface, and then stripping the resulting pellicle from such surface, after which the pellicle is united to the cloth, preferably by means of a suitable adhesive or bond, with or without, but preferably with pressure applied by smooth rollers or pressing surfaces.

In this way the smooth, bright surface of the pellicle is preserved and all the beauty of the nacreous luster is retained, yet the nacreous film is intimately and inseparably united with the cloth.

The union of the pellicle with the cloth may be accomplished by applying a liquid or fluid adhesive to the cloth and then pressing or rolling the nacreous pellicle thereon, or the adhesive might be applied to the pellicle, or the pellicle or the foundation might have in it an ingredient which will become sufficiently tacky when heat is applied to cause the pellicle to adhere firmly. Again, a thin pre-formed adhesion film, such as the well-known rubber or gutta percha tissue used for mending and other purposes, may be interposed between the cloth and the pearl film, then rolling or pressing between heated smooth rollers or surfaces, causing the adhesion film to melt and unite the layers.

The adhesives used may be any of the well known glues or cements suitable to the material to which the nacreous pellicle is applied. Rubber or gutta percha tissue or rubber cement, which may be employed, will make the material moisture-proof, which is an advantage in some cases.

The compositions used to form the body of the pellicle or the vehicle for the pearly particles are preferably on the order of spirit varnishes which harden on evaporation of the solvent. The best material for the purpose is a cellulose lacquer or solution, such as pyroxylin lacquer, which is soluble cellulose nitrate dissolved in amyl acetate or other suitable solvents, with or without camphor or other added ingredients, the collodions used in the manufacture of artificial pearls being suitable. Cellulose acetate solutions, which have the advantage of being non-inflammable, may be used, or any cellulosic composition adapted for forming flexible films. The pearl essence is incorporated with the lacquer or solution by kneading or mixing until it is evenly distributed. The vehicle must be carefully prepared so that it is clear or free from specks and spots, and the thin pellicle, rendered uniformly lustrous by the presence in it of the multitudinous crystalloid bodies, will be transparent or at least translucent. The degree of transparency and the amount of luster may be regulated by making the mixture richer or less rich in the pearl essence. Added ingredients may reduce the transparency or make the pellicle somewhat more opaque. The translucency of the pellicle permits the light rays to play between the crystalloids to bring out the lustrous effect. For this purpose it is necessary to thoroughly incorporate the luster-giving particles with the film-forming material in such manner and in such proportion as to evenly distribute the particles with spaces between, in order that light may play between them. The particles are extremely minute spindle- or rod-like bodies, transparent or translucent, and evidently prismatic, or having refracting surfaces, and the lustrous, pearl-like effect which is obtained is due to the refraction and reflection of the light rays by and among them.

The pellicle may be tinted in various colors or shades by the addition of pigments or substances which by chemical or other action will give a desired coloration. The transparent or translucent pellicles will permit the color of the cloth or other foundation to show through more or less, and beautiful effects may be obtained in this way.

The pellicle is best obtained by pouring or flowing the solution containing the pearl essence onto the surface of a very smooth glass or metal plate, or onto a smooth drum or cylinder, from which the exceedingly thin and flexible yet comparatively tough pellicle is stripped. The side of the pellicle which was next the smooth surface on which it was cast will be the brighter side, and this side will preferably be placed outward when the pellicle is applied to the cloth.

The thinness of the pellicle is an important factor, both for displaying the nacreous appearance and for securing perfect adhesion to the cloth foundation. In the case of light fabrics it is especially desirable to avoid any material increase in the body or stiffness of the cloth. The pellicle is preferably of such order of thinness that it possesses little or no sensible body, and I have been able to make and employ pellicles about one-half of one thousandth of an inch in thickness with excellent results. Naturally the thickness may be varied for different purposes.

While pellicles having a body of cellulose material are especially appropriate for my purpose, and are those particularly intended, I do not necessarily limit myself thereto, as other varnish-like materials or materials capable of producing flexible films might be employed.

The invention is not necessarily limited in its broader aspects to pellicles made by casing on smooth surfaces in the manner described, since it is contemplated that bright nacreous pellicles of cellulosic material charged with the fish-scale luster might be formed apart from the cloth to which they are subsequently applied, by other methods, as, for example, by extrusion.

I claim:

The herein described pearl cloth comprising cloth and a preformed brilliant nacreous film united thereto.

PAUL GANZINOTTI.